US005573163A

United States Patent [19]
Lee et al.

[11] Patent Number: 5,573,163
[45] Date of Patent: Nov. 12, 1996

[54] MOUNTING DEVICE FOR CYCLE PACKS

[75] Inventors: Brandon A. Lee, Daly City, Calif.; Gregory S. Hine, Boulder, Colo.

[73] Assignee: HS Industries, Inc., Louisville, Colo.

[21] Appl. No.: 386,625

[22] Filed: Feb. 10, 1995

[51] Int. Cl.$^6$ ....................................................... B62J 9/00
[52] U.S. Cl. ........................... 224/427; 224/428; 224/449; 224/463
[58] Field of Search ............................ 224/32 R, 39, 224/42, 252, 269, 547, 548, 553, 560, 561; 24/664, 665, 669, 599.4, 3.12, 3.13, 499, 502, 601.2; 383/23, 24

[56] References Cited

U.S. PATENT DOCUMENTS

| | | | |
|---|---|---|---|
| 347,965 | 8/1886 | Shamberger | 24/599.4 |
| 1,656,339 | 1/1928 | Runyan | 383/23 |
| 4,113,156 | 9/1978 | Brito | 224/269 |
| 4,213,589 | 7/1980 | Pierron et al. | 24/499 |
| 4,643,343 | 2/1987 | Goldman et al. | 224/32 R |
| 5,127,563 | 7/1992 | Chan et al. | 224/32 R |
| 5,190,345 | 3/1993 | Lin | 224/39 |
| 5,279,021 | 1/1994 | Edgin | 24/664 |

FOREIGN PATENT DOCUMENTS

| | | | |
|---|---|---|---|
| 66283 | 8/1945 | Denmark | 224/32 R |
| 538906 | 4/1993 | European Pat. Off. | 224/32 R |
| 4041460 | 6/1992 | Germany | 224/32 R |
| 81599 | 3/1951 | Norway | 224/32 R |
| 491480 | 9/1938 | United Kingdom | 224/32 R |
| 553487 | 5/1943 | United Kingdom | 224/32 R |
| 670657 | 4/1952 | United Kingdom | 224/32 R |

OTHER PUBLICATIONS

LaPlante, U.S. Patent No. 4,671,438, Jun. 9, 1987, p. 833, Official Gazette of the U.S. Patent and Trademark Office.
Dowrick et al., U.S. Patent No. 4,577,786, Mar. 25, 1986, p. 1637, Official Gazette of the U.S. Patent and Trademark Office.
Chan et al., U.S. Patent No. 5,127,563, Jul. 7, 1992, p. 172, Official Gazette of the U.S. Patent and Trademark Office.
Lin, U.S. Patent No. 5,190,345, Mar. 2, 1993, p. 223, Official Gazette of the U.S. Patent and Trademark Office.
Jackson, U.S. Patent No. 4,566,617, Jan. 28, 1986, p. 1448, Official Gazette of the U.S. Patent and Trademark Office.
Jackson, U.S. Patent No. 4,174,795, Nov. 20, 1979, p. 621, Official Gazette of the U.S. Patent and Trademark Office.
Melton, U.S. Patent No. 4,328,915, May 11, 1982, pp. 516–517, Official Gazette of the U.S. Patent and Trademark Office.

*Primary Examiner*—Henry J. Recla
*Assistant Examiner*—Gregory M. Vidovich
*Attorney, Agent, or Firm*—Harold A. Burdick

[57] ABSTRACT

A quick-release mount attached to a cycle pack, for example an under seat pack for a bicycle, is disclosed that includes a clip having first and second hangers positionable over first and second support, or frame, members of the bicycle. A resiliently movable catch is positioned adjacent to one leg of one of the hangers, thereby forming an entrapment for a support, or frame, member received thereat, the catch being movable by the support member when mounting the pack and movable by a user to allow release of the support member from the entrapment so that the pack may be removed from the bicycle. After movement, the catch returns to its original position adjacent to the leg of the hanger.

18 Claims, 2 Drawing Sheets

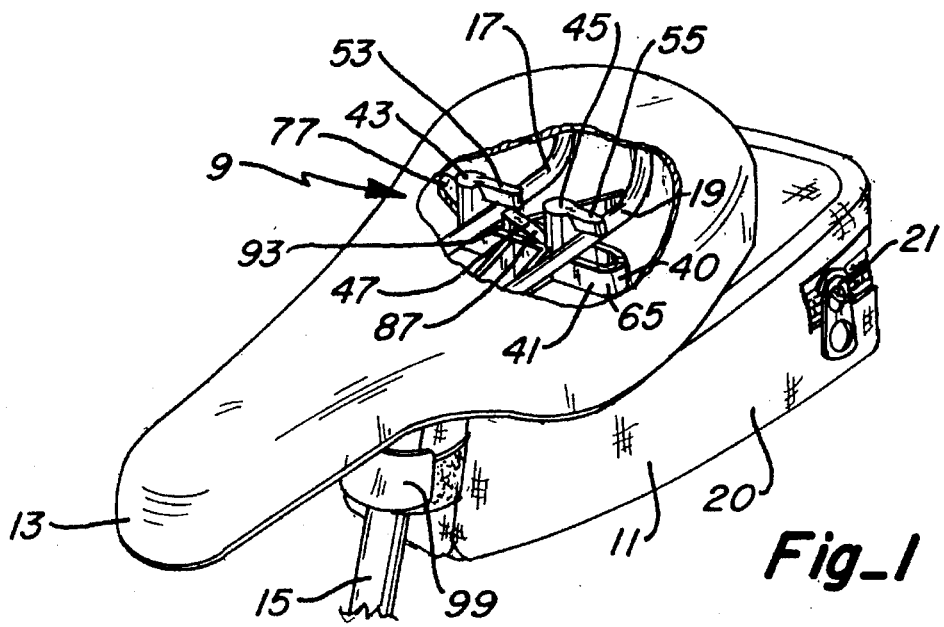
Fig_1
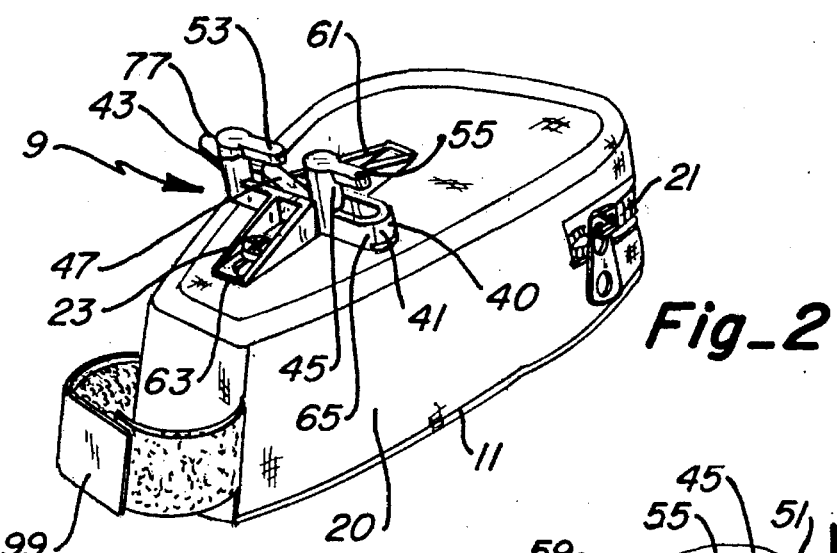
Fig_2
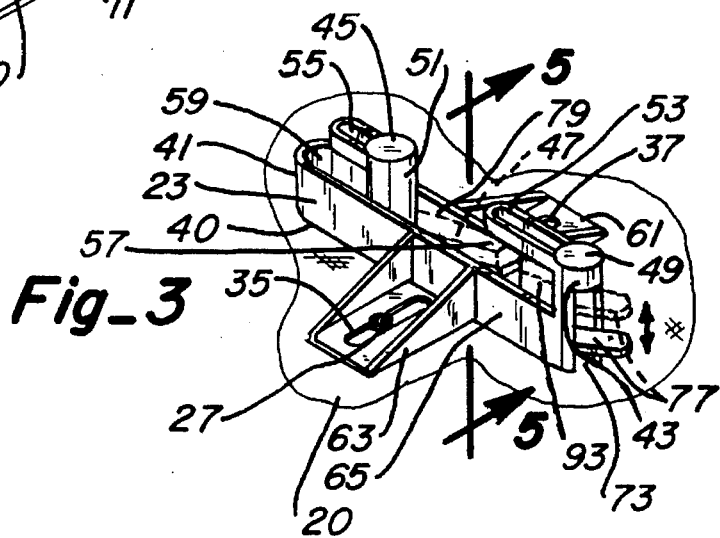
Fig_3

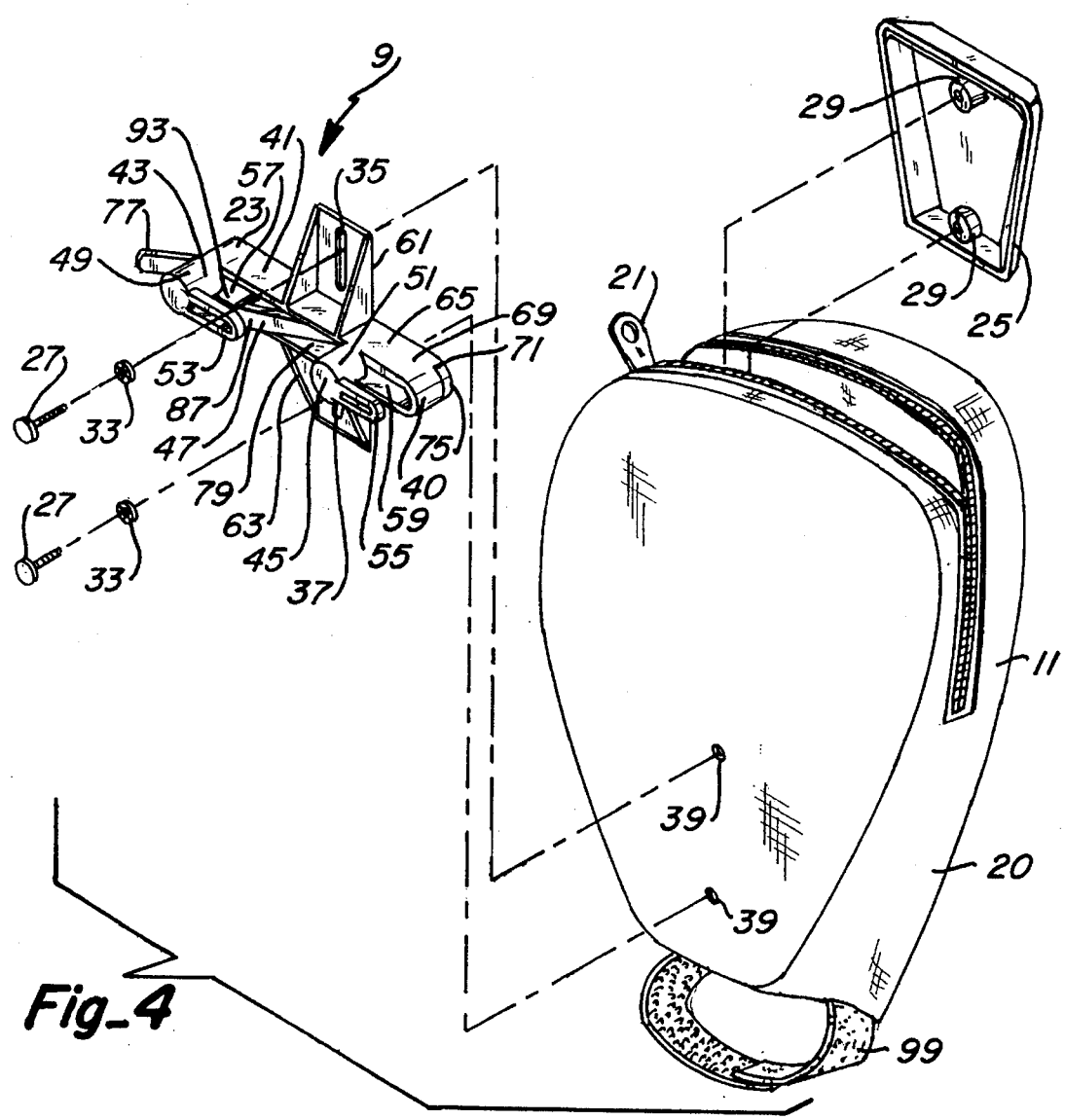
Fig_4
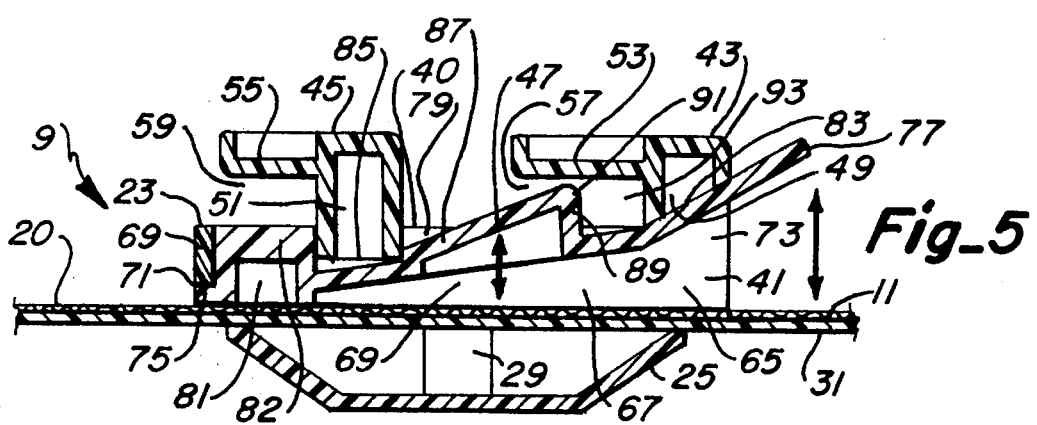
Fig_5

MOUNTING DEVICE FOR CYCLE PACKS

FIELD OF THE INVENTION

This invention relates to mountable packs, and, more particularly, relates to mechanisms for mounting such packs to a cycle.

BACKGROUND OF THE INVENTION

Various mounting systems for bicycle packs have been heretofore known and/or utilized, including clamping-type systems (see U.S. Pat. Nos. 4,671,438, 4,577,786, and 4,328,915), systems having cooperative elements attached to both the pack and the bicycle (see U.S. Pat. Nos. 5,190,345, 4,566,617, and 4,174,795), and systems utilizing cleats and belts in combination (see, for example, U.S. Pat. No. 5,127,563).

Heretofore known and/or utilized systems, however, have often proven cumbersome and/or added significant extra weight to the bicycle. Some are unduly complex to use, expensive to produce, and difficult to apply to the bicycle (often requiring modification of some part of the bicycle). Moreover, many have not provided a pack that is simple to remove from the bicycle, and/or (especially where straps or webbings are relied upon for securement) have not proved durable and stable in use. Further improvement could thus yet be utilized.

SUMMARY OF THE INVENTION

This invention provides a mounting device for cycle packs that is compact and lightweight, is durable, stable and simple to use for mounting and dismounting the pack, is inexpensive to produce, and which requires no modification of, or addition of parts to, the cycle. The mounting device includes a clip and a movable member, or catch, the clip being receivable over a structural member of the cycle and maintained thereat by the moveable member.

More particularly, the mounting device clip is attached to the pack and includes a first leg oriented to define a space between the leg and the pack when the clip is attached, the space configured to receive the structural member thereat. The movable member is affixed adjacent to the clip and oriented toward the leg so that an entrapment for the structural member when received at the space is defined by the movable member and the clip.

Preferably, the clip includes first and second hanger members extending from a base with each hanger member having a leg, the legs both extending in the same direction, and with different structural members being receivable at different ones of the hanger members. An attachment is provided for attaching the clip to a containment structure (for example, an under seat pack for a bicycle).

Each of the first and second hanger members also include a support from which the legs extend. The movable catch preferably includes a manually manipulable end, a barrier surface and a ramped surface, the surfaces converging at an edge portion, the catch attached for movement between a resting position with the edge portion adjacent to the leg of the first hanger member and a flexed position with the edge portion spaced from the leg of the first hanger member, the barrier surface of the catch and the leg and the support of the first hanger member defining the entrapment for one of the structural members of the cycle when the movable member is at the resting position. The the structural member is releasable from the entrapment by user manipulation of the manually manipulable end of the catch to move the catch from the resting position to the flexed position.

It is therefore an object of this invention to provide an improved mounting device for cycle packs.

It is another object of this invention to provide cycle mountable pack.

It is still another object of this invention to provide an improved mounting device for an under seat pack for a bicycle.

It is yet another object of this invention to provide a mounting device for cycle packs that is compact and lightweight, is durable, stable and simple to use for mounting and dismounting the pack, is inexpensive to produce, and which requires no modification of, or addition of parts to, the cycle.

It is still another object of this invention to provide a device for mounting a pack to a structural member of a cycle which includes a clip attached to the pack and receivable over the structural member of the cycle and a movable member oriented so that an entrapment for the structural member is defined by the movable member and the clip.

It is still another object of this invention to provide a device for mounting a pack to a structural member of a cycle having a clip attached to the pack and including a leg oriented to define a space between the leg and the pack when the clip is attached, the space configured to receive the structural member thereat, and a movable member affixed adjacent to the clip and oriented toward the leg so that an entrapment for the structural member when received at the space is defined by the movable member and the clip.

It is yet another object of this invention to provide a cycle mountable pack including a containment structure, a clip having first and second hanger members extending from a base and each having a leg, the legs both extending in the same direction, a movable member adjacent to the first hanger member and oriented toward the leg of the first hanger member, and an attachment for attaching the clip to the containment structure.

It is yet another object of this invention to provide a device for mounting a pack to structural members of a bicycle that includes first and second hanger members connectable with the pack, the hanger members each having a leg and a support, the structural members being receivable at different ones of the hanger members, and a resiliently movable catch including a manually manipulable end, a barrier surface and a ramped surface, the surfaces converging at an edge portion, the catch attached for movement between a resting position with the edge portion adjacent to the leg of the first hanger member and a flexed position with the edge portion spaced from the leg of the first hanger member, the barrier surface of the catch and the leg and the support of the first hanger member defining an entrapment for one of the structural members when the structural member is received thereat and when the movable member is at the resting position, the one of the structural members being releasable from the entrapment by user manipulation of the manually manipulable end of the catch to move the catch from the resting position to the flexed position.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view having a cut away portion showing use of the device of this invention for mounting a pack under the seat of a bicycle;

FIG. 2 is a perspective view of the device and pack of FIG. 1;

FIG. 3 is a perspective view of the cycle mounting mechanism of the device of this invention illustrating operation of the resiliently movable catch thereof;

FIG. 4 is an exploded view of the device and pack of FIG. 2; and

FIG. 5 is a sectional view taken through section lines 5—5 of FIG. 3.

DESCRIPTION OF THE INVENTION

The preferred embodiment of mounting device 9 of this invention is illustrated in the FIGURES for deployment on pack 11. Pack 11 is mounted below seat 13 of a bicycle (the mounting device could be configured for other types of packs, such as panniers, for connection to other structural elements of the cycle or to structural elements provided for the purpose, or for other types of cycles, such as motor cycles).

Bicycle seat 13 is typically mounted on seat post 15 and includes, as is common, spaced seat structural members (seat rails) 17 and 19. Pack 11 may be variously configured, and as shown includes a normally soft-sided containment structure 20 and access closure 21 (such as a zipper) for allowing access to the interior of the pack through an opening in containment structure 20 sealable by access closure 21.

Device 9 of this invention includes mounting mechanism 23 attached to containment structure 20 using attachment plate 25 and screws 27 (see FIG. 4). Plate 25 is positioned inside containment structure 20 and includes threaded reinforcing guides 29 for receipt thereat of screws 27 to secure mechanism 23. Reinforcing wall 31 (FIG. 5) is connected (by gluing, stitching, heat or sonic welding or the like) to the inner surface of containment structure 20 to add stiffness to the wall of the pack where mechanism 23 is attached.

To assemble device 9 on pack 11, screws 27 are inserted through washers 33, slots 35 and 37 of mounting mechanism 23 and apertures 39 in containment structure 20 and reinforcing wall 31, and are threaded into guides 29. Before tightening, or as necessary, mechanism 23 may be adjusted by sliding the mechanism (with slots 35 and 37 moving relative to screws 27) to achieve desired positioning of mechanism 23 on pack 11.

Mechanism 23 includes clip 40, having base section 41 and hanger members 43 and 45, and resiliently movable catch 47. Base section 41 and hanger members 43 and 45 (i.e., clip 40) are preferably unitarily formed (for example, molded of carbon plastic or the like). Catch 47 is made of a resilient material (again, such as carbon plastic) and is affixed in base section 41 (for example, by heat or sonic welding, gluing or the like). Hanger members 43 and 45 are formed by supports 49 and 51 extending from base section 41 and legs 53 and 55, respectively, extending (each in the same direction) from the supports (see FIG. 5). Spaces 57 and 59 are thus defined between base section 41 and leg 53 and 55, respectively.

Base section 41 includes mounting wings 61 and 63 having slots 35 and 37, respectively, therethrough, and catch housing 65. Catch housing 65 (as shown in FIG. 5) includes open interior 67 formed by wall 69 for receipt and movement therein of catch 47. Apertures 71 and 73 are provided to receive mounting toe 75 and manually manipulable end 77, respectively, of catch 47, end 77 being movable in aperture 73 as indicated in FIGS. 3 and 5.

Opening 79 allows movement of catch 47 toward and away from leg 53 and into space 57 as hereinafter described. Opening 81 adjacent to support 51 is provided for securement therein of catch mounting block 82. Supports 49 and 51 are positioned and configured relative to catch housing 65 and mounted catch 47 to provide bearing surfaces 83 and 85, respectively, limiting the range of movement of catch 47 toward leg 53 thus defining the resting position of catch 47 (i.e., that position to which resilient catch 47 will return after being flexed).

Catch 47 includes ramped surface 87 extending between mounting block 82 and manually manipulable end 77 and within opening 79 between supports 49 and 51. Barrier surface 89 extends from end 77 to edge 91 at the interface between surfaces 87 and 89. When catch 47 as thus configured is mounted in base section 41, entrapment 93 for a cycle support member (17 as shown in FIG. 1) is defined by surface 89 of catch 47, leg 53 and support 49 of hanger 43, and both end 77 adjacent to surface 89 of catch 47 and the top of wall 69 of housing 65 thereat.

As shown in FIGS. 1, 2 and 4, strapping 99 may be provided on pack 11 to provide added stability of the mounted pack. The strap includes a hook and loop interface (such a VELCRO) for securing the strap around a selected structural member of the cycle, such as seat post 15.

Referring to FIGS. 1, 3 and 5, it will be appreciated how simply mounting and dismounting of pack 11 is accomplished utilizing device 9 of this invention. Pack 11 with mounting mechanism 23 attached thereto is positioned under seat 13 of the cycle with structural member 17 impinging on ramped surface 87 of catch 47 adjacent to space 57 below leg 53 of hanger member 49. Structural member 19 is then adjacent to space 59 below leg 55 of hanger member 51.

The user then slides the pack 11/mounting mechanism 23 assembly so that supports 49 and 51 are moved toward structural members 17 and 19 and the structural members are moved into spaces 57 and 59. As structural member 17 moves into space 57 below leg 53, ramped surface 87 will cause movement of catch 47 toward a flexed position nearer pack 11 thus opening a gap between catch 47 at edge 91 and leg 53 through which structural member 17 may pass. When structural member 17 has passed edge 91, catch 47 resiliently returns to it resting position with edge 91 adjacent to leg 53 thus capturing structural member 17 in entrapment 93. Structural member 19 will then be maintained within space 59 below leg 55 of hanger member 51. Strapping 99 is secured to complete mounting of the pack.

To release the pack 11/mounting mechanism 23 assembly from the cycle once the auxiliary strapping is released, the user simply depresses manually manipulable end 77 (see FIG. 3) of catch 47 to move catch 47 to the flexed position thereby opening the gap between catch 47 at edge 91 and leg 53 through which structural member 17 may pass. The assembly is then slid off the structural members.

As may be appreciated, an improved mounting device for cycle packs is provided which is compact and lightweight, is durable, stable and simple to use for mounting and dismounting the pack, is inexpensive to produce, and which requires no modification of, or addition of parts to, the cycle. While use of multiple hanger members and a single catch is illustrated herein, it should be appreciated that multiple catches could be used with multiple hanger members. Moreover, only a single catch and a single hanger member could be utilized, with or without other means of attachment to stabilize the pack, all as may be required for mounting of a given pack configuration and/or for mounting the pack at a given position on a particular cycle.

What is claimed is:

1. A device for mounting a pack to a cycle comprising:

a clip adapted to be attached to the pack and including first and second hanger members each having a support with a leg extending therefrom, said legs oriented to define a space between each of said legs and the pack when said clip is attached, the space configured to receive structural member of the cycle thereat; and a movable member having a mounting portion, a manually manipulable portion, and a middle portion between said mounting portion and said manually manipulable portion, said mounting portion affixed to said clip below said second hanger member, said middle portion extending from said mounting portion and having a barrier surface biased toward said leg of said first hanger member so that an entrapment for the structural member when received at said space between said leg of said first hanger member and the pack is defined with the structural member between said barrier surface of said middle portion of said movable member and said support of said first hanger member, and said manually manipulable portion extending from said barrier surface and through said support of said first hanger member to an end.

2. The device of claim 1 wherein said middle portion of said movable member includes a ramped surface extending to an edge of said barrier surface, said edge being most adjacent to said leg of said first hanger member or said clip.

3. The device of claim 1 wherein said clip includes structure limiting range of movement of said movable member.

4. The device of claim 1 wherein said clip includes a base and wherein said mounting portion of said movable member is affixed in said base.

5. The device of claim 1 wherein said leg of said second hanger member is positioned relative to said leg of said first hanger member to receive a different structural member of the cycle at said space defined by said leg of said second hanger member.

6. The device of claim 1 further comprising means received in the pack to accommodate attachment of said clip to the pack.

7. A pack mountable on a part of a cycle comprising:

a containment structure;

a clip having a base and first and second hanger members extending from first and second spaced positions, respectively, at said base and each having a leg, said legs both extending in the same direction;

a movable member attached at said base of said clip beneath said second hanger member immediately adjacent to said second position and with a first portion thereof ramping from said second position at said base to immediately adjacent said leg of said first hanger member, said movable member configured to allow the part of the cycle to be received and retained between said first hanger member and said first portion of said movable member; and attachment means for attaching said clip to said containment structure.

8. The pack of claim 7 wherein said movable member is movable between a resting position with said first portion thereof adjacent to said leg of said first hanger member and a flexed position with said first portion spaced from said leg of said first hanger member.

9. The pack of claim 8 wherein said first hanger member includes a support between said base and said leg thereof, said leg of said first hanger member extending from said support, and wherein said movable member has a barrier surface, said barrier surface of said movable member and said leg and said support of said first hanger member defining an entrapment for the part of the cycle when the part is received thereat and when said movable member is at said resting position.

10. The pack of claim 9 wherein said first portion of said movable member extends to an edge of said barrier surface.

11. The pack of claim 8 wherein said movable member includes a manually manipulable portion for user movement of said movable member from said resting position to said flexed position.

12. The pack of claim 8 wherein said clip includes structure limiting range of movement of said movable member thus defining said resting position.

13. The pack of claim 7 wherein the part of the cycle is one of first and second spaced structural members of a cycle seat and wherein said containment structure is configured for deployment under the seat of the cycle, said hanger members being spaced from each other at said base of said clip so that the structural members are receivable in different ones of spaces defined between said base and said legs of said first and second hanger members.

14. The pack of claim 7 further comprising strapping means connected to said containment structure for further stabilizing said pack when mounted on the cycle by engaging said strapping means around a structural member of the cycle.

15. A device for mounting a pack to structural members of a bicycle comprising:

first and second hanger members engaged with a base which is connectable with the pack, said hanger members each having a leg extending from a support engaged at said base, the structural members being receivable at different ones of said hanger members; and a resiliently movable catch including a connecting end affixed in said base adjacent to said second hanger member and a manually manipulable end, said catch having a barrier surface and a ramped surface residing between said supports of said first and second hanger members, said barrier and ramped surfaces converging with each other to define an edge portion of said catch, said catch being movable between a resting position with said edge portion adjacent to said leg of said first hanger member and a flexed position with said edge portion spaced from said leg of said first hanger member, said barrier surface of said catch and said leg and said support of said first hanger member defining an entrapment for one of the structural members when the structural member is received thereat and when said movable member is at said resting position, the one of the structural members being releasable from said entrapment by user manipulation of said manually manipulable end of said catch to move said catch from said resting position to said flexed position.

16. The device of claim 15 wherein said support of said first hanger member has an opening thereat, and wherein said manually manipulable end of said catch extends from said barrier surface opposite said edge portion through said opening in said support of said first hanger member.

17. The device of claim 15 wherein at least one of said supports includes structure configured to limit movement of said catch and define said resting position.

18. The device of claim 15 wherein said legs of said first and second hanger members extend from said supports in the same direction.

* * * * *